United States Patent
Zhang et al.

(10) Patent No.: US 7,932,632 B2
(45) Date of Patent: Apr. 26, 2011

(54) SWITCHING POWER SUPPLY WITH OVERVOLTAGE PROTECTION AND OVERVOLTAGE PROTECTION METHOD THEREOF

(75) Inventors: Huajian Zhang, Shenzhen (CN); Yonggang Ru, Shenzhen (CN); Shiqiang Yu, Shenzhen (CN); Baoguo Chen, Shenzhen (CN)

(73) Assignee: Emerson Network Power Energy Systems AB, Stockholm (SE)

( * ) Notice: Subject to any disclaimer, the term of this patent is extended or adjusted under 35 U.S.C. 154(b) by 471 days.

(21) Appl. No.: 11/794,852

(22) PCT Filed: Jan. 6, 2006

(86) PCT No.: PCT/CN2006/000009
§ 371 (c)(1),
(2), (4) Date: Nov. 6, 2008

(87) PCT Pub. No.: WO2006/072216
PCT Pub. Date: Jul. 13, 2006

(65) Prior Publication Data
US 2009/0152950 A1    Jun. 18, 2009

(30) Foreign Application Priority Data

Jan. 8, 2005    (CN) .......................... 2005 1 0006044

(51) Int. Cl.
*H02J 1/10* (2006.01)
(52) U.S. Cl. ......................................................... 307/43
(58) Field of Classification Search ................... 307/43, 307/64–66, 31; 363/74, 97; 323/234
See application file for complete search history.

(56) References Cited

U.S. PATENT DOCUMENTS

| | | | |
|---|---|---|---|
| 5,347,164 A * | 9/1994 | Yeh .................................. 307/66 |
| 5,818,675 A * | 10/1998 | Lu ................................. 361/93.9 |
| 6,195,275 B1 * | 2/2001 | Lu .................................... 363/65 |
| 6,798,178 B1 * | 9/2004 | Bayadroun .................... 323/274 |
| 6,856,103 B1 * | 2/2005 | Hudson et al. ................ 315/308 |
| 7,679,939 B2 * | 3/2010 | Gong ......................... 363/21.18 |
| 2005/0017699 A1 | 1/2005 | Stanley |

FOREIGN PATENT DOCUMENTS

| | | |
|---|---|---|
| CN | 1479424 A | 3/2004 |
| JP | 11-178351 | 7/1999 |
| JP | 2001-095240 | 4/2001 |

* cited by examiner

*Primary Examiner* — Albert W Paladini
(74) *Attorney, Agent, or Firm* — Harness, Dickey & Pierce, P.L.C.

(57) ABSTRACT

A switching power supply with overvoltage protection includes a soft start circuit, a rectifying circuit, a filter capacitor, a main supply, an auxiliary supply and a monitoring circuit. When the input voltage is higher than the predetermined protection voltage, a first electric control switch is turned off, and the main power circuit of the switching power supply is shut off. At the moment, the actuation and release of the second electric control switch is controlled so as to control the input power supply to intermittently charge the power supply module such that the output voltage downstream of the rectifying circuit inside the power supply is controlled in a safe range. For instance, the second electric control is turned on when the output voltage is lower than a certain value, and is turned off when the output voltage is higher than a certain value. Thus, it is ensured that the bus line voltage inside the power supply is controlled within a safe range, to ensure the safety of the devices inside the power supply; and at the same time to ensure the safety of the inner devices of the switching power supply, such that the auxiliary power supply and the control circuit can work normally.

9 Claims, 17 Drawing Sheets ate lower than a predetermined release voltage threshold, the monitoring circuit controls the first and second electric control switches to return to an initial state, AC charges the filter capacitor through the soft start resistor and the second electric control switch, thus the overvoltage protection is completed and returns to a normal operating state.

SWITCHING POWER SUPPLY WITH OVERVOLTAGE PROTECTION AND OVERVOLTAGE PROTECTION METHOD THEREOF

TECHNICAL FIELD

The present invention relates to a switching power supply with overvoltage protection and overvoltage protection method thereof.

DESCRIPTION OF THE RELATED ART

In a switching power supply module, topology of circuit as shown in FIG. 1 is usually employed, comprising a soft start circuit, a rectifying circuit, a filter circuit (generally consisting of a filter capacitor), a main power supply (consisting of a main DC/DC converter and its output filter), an auxiliary power supply and a monitoring circuit. A power factor correction circuit, namely PFC circuit is provided between the rectifying circuit and the main power supply in some of the switching power supplies.

If the voltage of the input power supply is too high, then some protective measures have to be employed for preventing damage to the power supply module. Common protective measure is to shut off the main circuit (PFC and the DC/DC converter) of the power supply, to stop the power output, and to switch off the input soft start relay, so as to ensure the decreasing of inrush after the input power supply returns to a normal state. The input power supply continues to supply a current to the filter circuit through a soft start resistor and the rectifying circuit when the relay is in an OFF state, so as to insure that the auxiliary power supply and the monitoring circuit continue to function normally. At the moment, the input voltage is decreased to a certain extent due to the voltage dividing function of the soft start resistor, so as to obtain certain protective effect.

Aforesaid protection only functions in a certain range of voltage of the input power supply. Therefore, in the situation of overvoltage, the voltage of the input power supply can not be too high, otherwise insufficient withstand voltage will result in damage. However, there may be a very high input voltage, e. g. when the input phase voltage is connected to a line voltage by accident, the input voltage will be as high as 380 Vac, and the peak voltage will exceed 500 Vdc, and many devices in the power supply module have insufficient withstand voltage at the moment. Therefore, under a desired overvoltage protection, the excessive voltage should be disconnected from the successive stage, namely overvoltage disconnecting rather than only voltage division.

However, in the switching power supply of prior art, the module can not achieve a overvoltage disconnecting protection when the AC voltage of the module is too high, because the operation of the auxiliary power supply stops after being disconnected from the AC voltage, and there is no power supply for maintaining the disconnecting device. Thus, an additional protective device is required, for example, by adding an isolation device such as an AC contactor on the system, and the isolation of the power network is achieved by controlling of connecting and disconnecting of the isolation device. However, there exist the following problems that: 1) an additional device is required, which may cause the increase of the cost; 2) the whole system can not work normally when the additional device malfunctions.

Apparently, method such as tripping may be employed to completely shut off the power supply, and protection to the successive devices may be achieved. However, by doing so, the module can not return to a normal operation state after the input voltage returns to a normal state, thus can not meet the requirement.

SUMMARY OF THE INVENTION

One object of the present invention is to provide a switching power supply with overvoltage protection and overvoltage protection method thereof, to solve the protection problems of the module of the prior art under an overvoltage, and to return to a normal work state in time after the overvoltage.

To achieve the aforesaid object, the present invention provides a switching power supply with overvoltage protection and overvoltage protection method thereof.

The switching power supply with overvoltage protection comprises a soft start circuit, a rectifying circuit, a filter capacitor, a main power supply, an auxiliary power supply and a monitoring circuit; the soft start circuit comprises a soft start resistor and a first electric control switch positioned in a branch in parallel with the soft start resistor; after AC current is inputted into the rectifying circuit for rectifying and into the filter capacitor for filtering via the soft start circuit, the resulted DC current is outputted to the main power supply and the auxiliary power supply respectively; the auxiliary power supply supplies DC voltage to the monitoring circuit, while the monitoring circuit monitors the input or/and output voltage of the switching power supply, and controls the first electric control switch of the soft start circuit; the present invention is characterized in that a second electric control switch is provided, wherein the second electric control switch is connected in series with the soft start resistor, the control end of the second electric control switch is connected with the monitoring circuit, the monitoring circuit controls the ON or OFF state of the second electric control switch.

The aforesaid solution may have the following modification or improvement:

The present invention may further comprise a second impedance connected in parallel with the second electric switch.

The present invention may further comprise a second impedance and a third impedance, the third impedance and the second electric control switch are connected in series, and then are connected with the second impedance in parallel.

The present invention may further comprise a second auxiliary power supply, the input end of which is connected with a battery, and the output end of which is connected with the monitoring circuit.

The first and second electric control switches are relays.

The overvoltage protection method for a switching power supply comprises the following steps: S1: a monitoring circuit monitors the input voltage or/and output voltage of a switching power supply; S2: if AC input is in the allowable range, then the open and close states of the first electric control switch of normal open type and the second electric control switch of normal close type are controlled such that AC charges the filter capacitor through the soft start resistor and the second electric control switch, after the completion of the soft start, the first electric control switch is controlled to be turned on and the module enters a normal operating state; S3: when the AC input has an overvoltage, the voltage of the filter capacitor rises, if a voltage higher than the predetermined voltage threshold on the filtering capacitor is detected by the monitoring circuit, the control circuit cuts off the first and second electric control switches K1, K2, and the energy stored in the filter capacitor maintains the OFF state of the second electric control switch; S4: when the energy stored in the filter capacitor is consumed and its voltage is lowered to a certain threshold, the second electric control switch returns to the ON state such that AC can charge the filter capacitor through the soft start resistor and the second electric control switch, therefore, the voltage of the filtering capacitor rises gradually; S5: if the voltage of the filter capacitor exceeds the allowable value again, the second electric control switch will be cut off again and the aforesaid steps S3, S4 repeat; S6: until the voltage of AC input decreases to be in the normal range, the states of the first and second electric control switches K1 and K2 are controlled such that the module enters into a normal operating state.

The aforesaid solution may have the following modification or improvement:

A second voltage threshold is set in advance in the monitoring device, such that the second electric control switch is controlled by the monitoring circuit to return to the ON state when it is detected that the voltage is lower than the threshold.

The time of turning on or turning off of the first and second electric control switches is set, at the time the input voltage being lower than the bus line voltage, such that there is no current when the relay turns on or cuts off.

The advantages of the aforesaid technical solutions lie in that when the input voltage is higher than the predetermined protection voltage, a first electric control switch is turned off, and the main power circuit of the switching power supply is shut off. At the moment, the only branch that can supply electric energy to the successive stages is the soft start resistor branch. Since the second electric control switch is positioned in this branch, or positioned in the DC bus line after rectification, the actuation and release of the second electric control switch is controlled to control the input power supply to intermittently charge the power supply module, such that the output voltage after the rectifying circuit inside the power supply is controlled in a certain range, e.g. the second electric control is turned on when the output voltage is lower than a certain value (the value may be zero), and is turned off when the output voltage is higher than a certain value. Thus, it is ensured that the bus line voltage inside the power supply is controlled within a safe range, to ensure the safety of the devices inside the power supply; and at the same time to ensure the safety of the inner devices of the switching power supply, such that the auxiliary power supply and the control circuit can work normally. In other words, the auxiliary power supply and overvoltage protection is maintained by an alternating mode.

DESCRIPTION OF THE PREFERRED EMBODIMENTS

Figure 1:
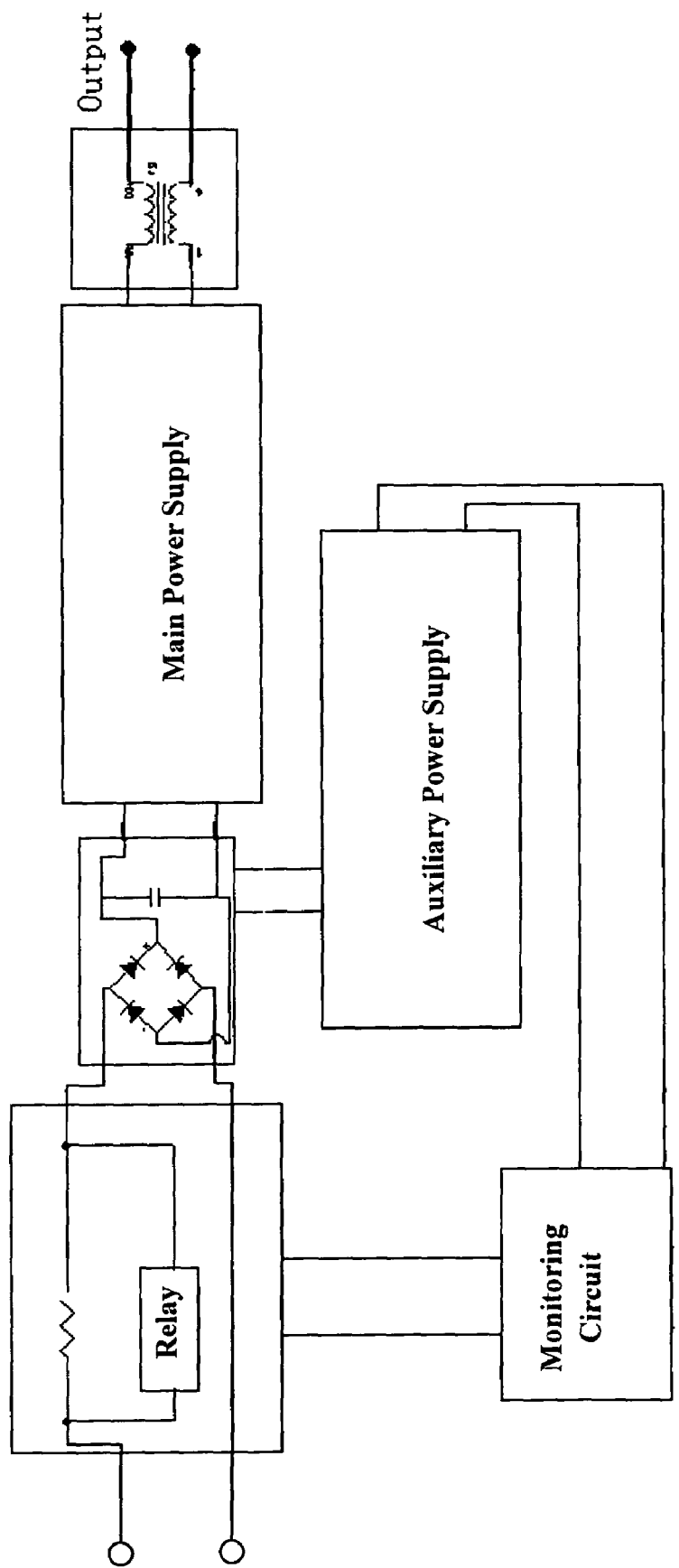
FIG. 1 shows a schematic view of the power supply module of a conventional communication device of prior art.
Figure 2:
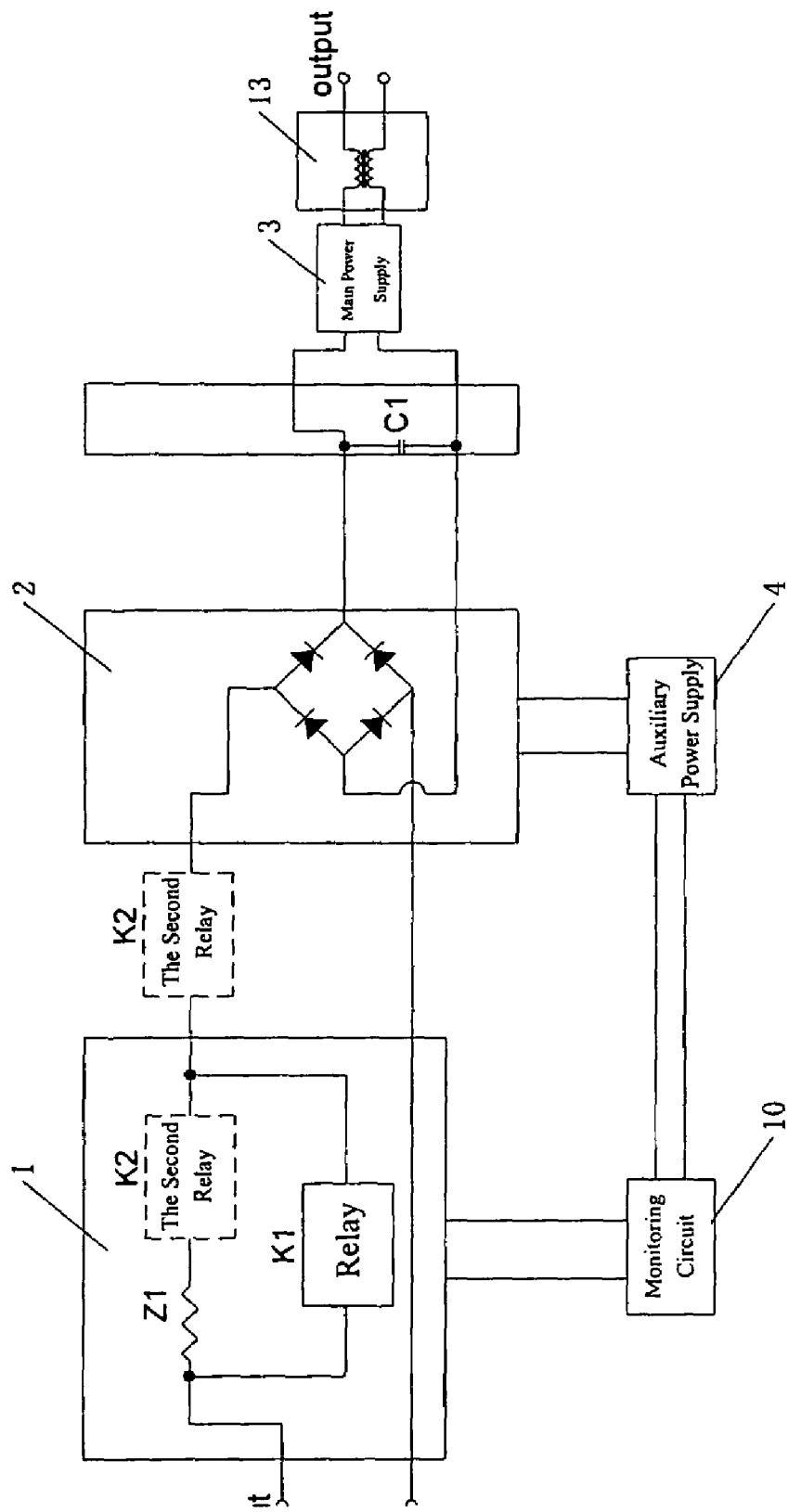
FIG. 2 shows a schematic view of the power supply module of a communication device of the present invention.

FIG. 2 shows a general schematic view of the several embodiments of the present invention discussed below, wherein the second relay is shown in dashed line since it has two alternative positions. As shown in FIG. 2, the switching power supply with overvoltage protection of the present invention comprises a soft start circuit 1, a rectifying circuit 2, a filter capacitor C1, a main power supply 3, an auxiliary power supply 4 and a monitoring circuit 10, wherein the soft start circuit 1 comprises a soft start resistor Z1 and a first electric control switch K1 positioned in a parallel branch of the soft start resistor Z1; after AC current is inputted into the rectifying circuit 2 for rectifying and into the filter capacitor C1 for filtering via the soft start circuit 1, the resulted DC current is outputted to the main power supply 3 and the auxiliary power supply 4 respectively; the auxiliary power supply 4 supplies DC voltage to the monitoring circuit 10, while the monitoring circuit 10 monitors the input or/and output voltage of the switching power supply and controls the first electric control switch K1 of the soft start circuit. The primary improvement of the present invention lies in that a second electric control switch K2 is provided. The second electric control switch K2 is connected in series on the phase line on which the soft start resistor Z1 is disposed. The control end of the second electric control switch K2 is connected with the monitoring circuit 10 which controls the ON and off state of the second electric control switch K2.

The present invention will be further described in details below with reference to the accompanying drawings and the preferred embodiments. The first, second electric control switches K1, K2 are relays in these embodiments, but are not limited to relays. Thyristor can also be used.

Embodiment 1

Figure 3A:
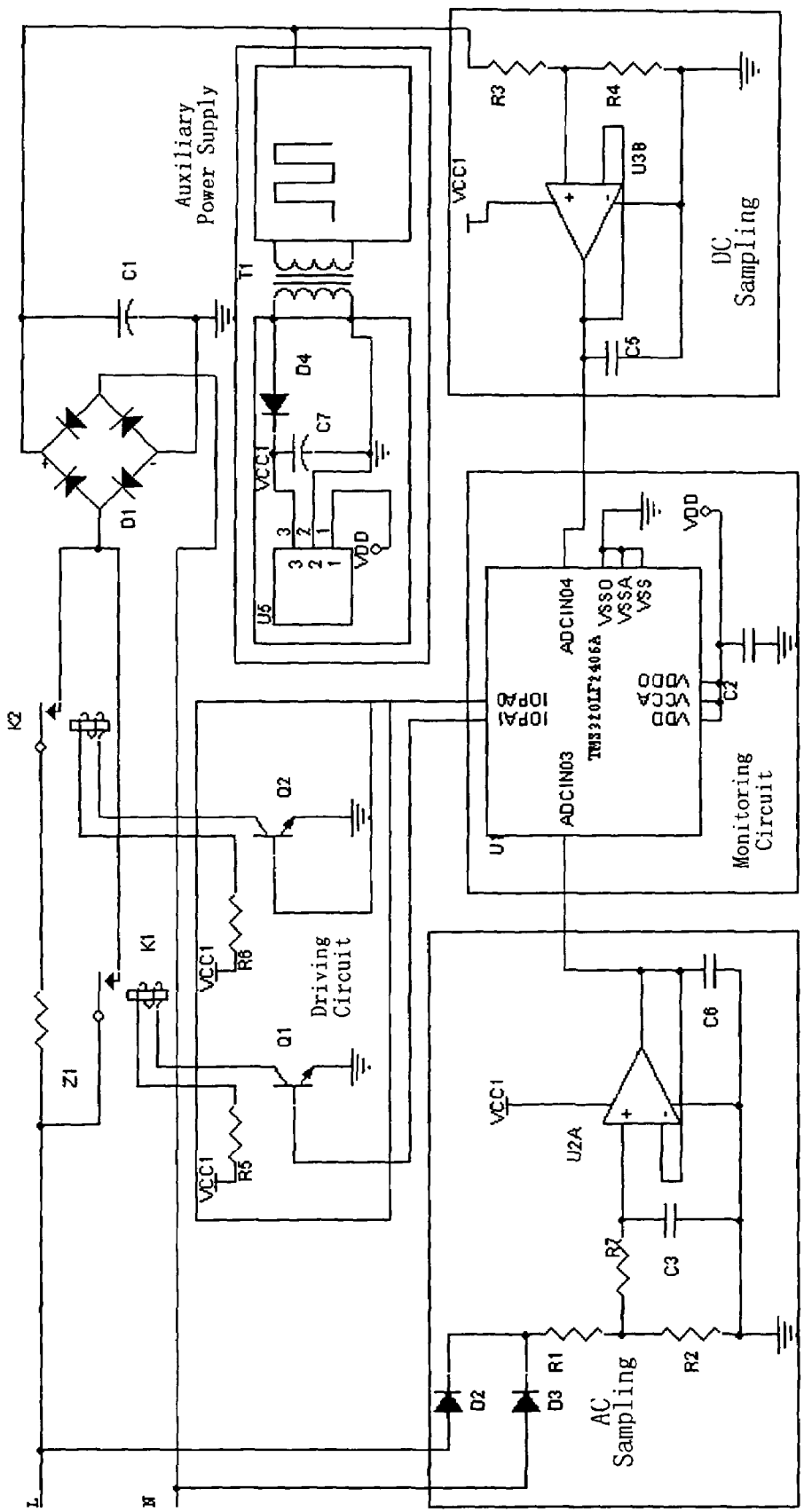
FIG. 3a shows a schematic view of the principle of a partial circuit according to embodiment 1 of the present invention (the main power supply and its downstream output end are omitted).

As shown in FIG. 3a, the first and second electric control switches K1, K2 are relays in the present embodiment, wherein the second relay K2 and the soft start resistor Z1 are connected in series, and then connected with the first relay K1 in parallel.

There are two kinds of control strategies as shown in the following depending on the step S4:

1) The first control strategy: The first electric control switch K1 is set to be in a normal open state, and the second electric control switch K2 is set to be in a normal close state in advance, such that when the energy stored in the filter capacitor C1 is consumed and is insufficient to actuate the second electric control switch K2, the second electric control switch K2 will be closed automatically, and return to an ON state.

2) The second control strategy: A voltage threshold is set in the monitoring device 10 in advance. When it is detected that the voltage is lower than the threshold, the second electric control switch K2 is controlled by the monitoring circuit 10 to return to an ON state.

Figure 3B:
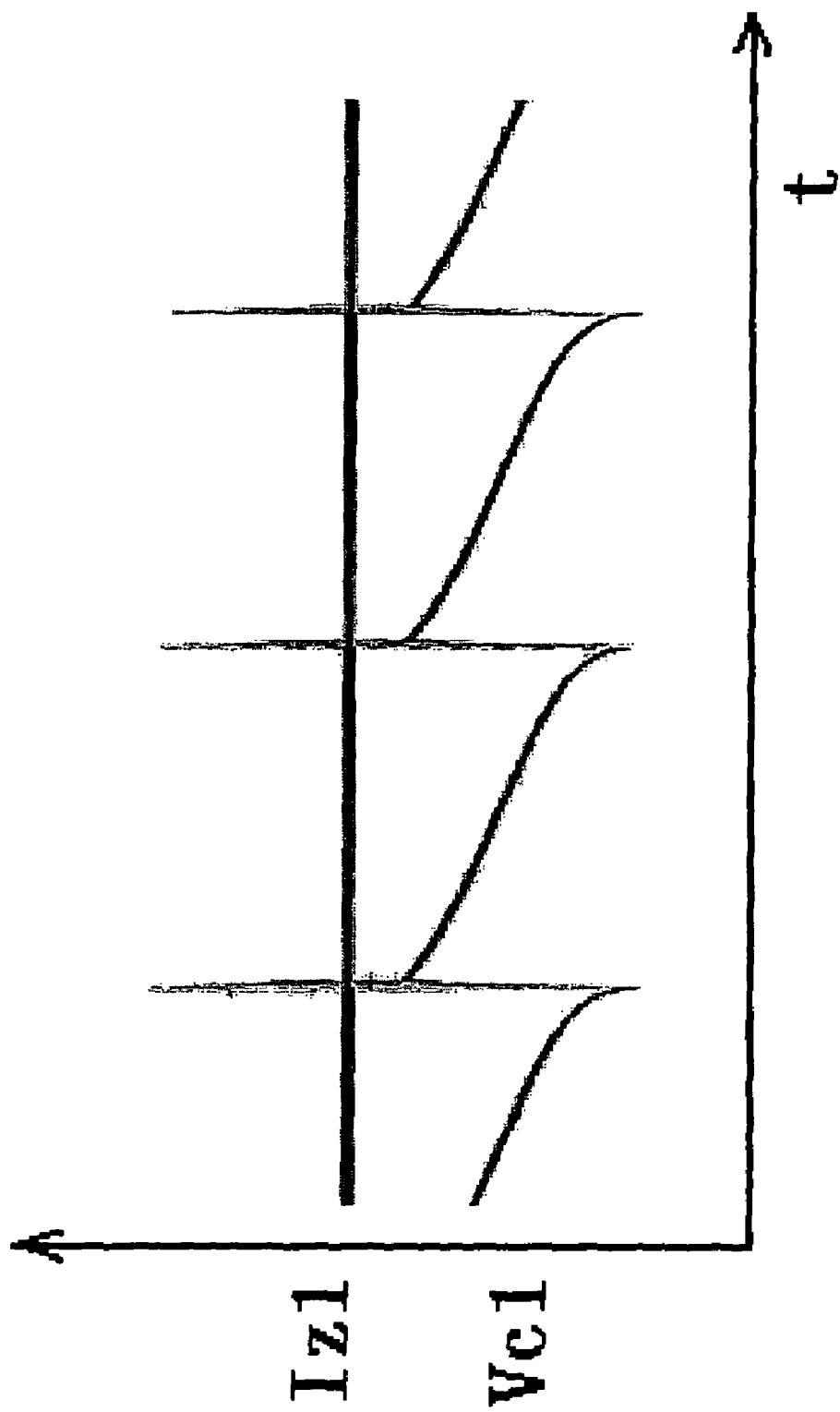
FIG. 3b shows a schematic view of the operating waveform IZ1 of a first control strategy of embodiment 1 of the present invention.
Figure 3C:
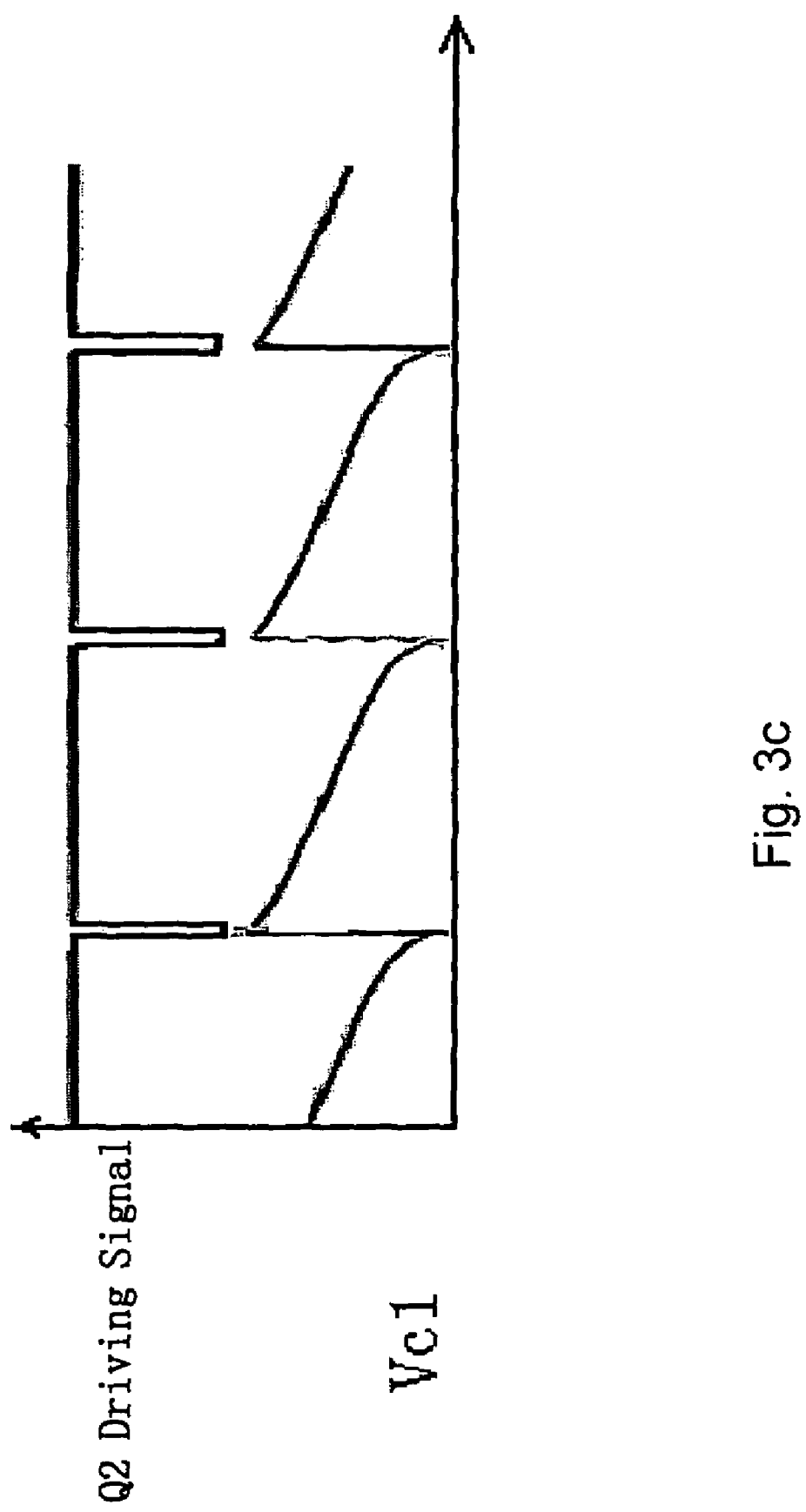
FIG. 3c shows a schematic view of the operating waveform of the driving signal Q2 of a first control strategy of embodiment 1 of the present invention.

The operating principle of the first kind of control strategy of the present embodiment is shown in FIGS. 3b, 3c.

The AC input of the module is converted to DC after being rectified and filtered, then is outputted as respective operating voltage after being further converted. To achieve the normal operation of the control circuit, this kind of module will convert the rectified DC into one or more low power supply, namely the auxiliary power supply as shown in the drawings, to maintain the operating of the control circuit. K1 is in a normal open state and K2 is in a normal close state, to insure that the circuit can be started normally.

State 0: when the AC input is in the allowable range, AC charges the high voltage capacitor (namely the filter capacitor C1) through Z1, K2. After the completion of the soft start, K1 turns on and the module enters a normal operating state.

State 1: when the AC input is under an overvoltage, the voltage of C1 rises. If voltage of C1 does not exceed the allowable voltage of the capacitor, no action is performed; if a voltage of C1 higher than the allowable voltage of the capacitor is detected, the control circuit cuts off K1, K2, and the energy stored in the capacitor C1 maintains the OFF state of K2 while the normal open device K1 does not consume any energy. When the stored energy is used up or nearly used up, K2 returns to an ON state, and the module supplies energy to the high voltage DC capacitor C1 again. Therefore, the voltage of C1 rises gradually. If voltage of C1 exceeds the allowable voltage again, K2 will be cut off again and the aforesaid steps repeat; if the voltage of the capacitor C1 does not exceed the allowable voltage, K2 will not be cut off; if the voltage of AC input decreases to be in the normal range, K2 is actuated and K1 is actuated in a delay mode, the module starts to a normal work.

Thus, failure of the module under high voltage is prevented by the alternating mode of K2. It is noticed that the actuation and release of K2 is achieved by the nature character of charge and discharge of C1. In this way, since K2 will be switched automatically when the voltage is lowered to a certain value, the monitoring circuit 10 does not need to monitor the lowest value of voltage.

Figure 3D:
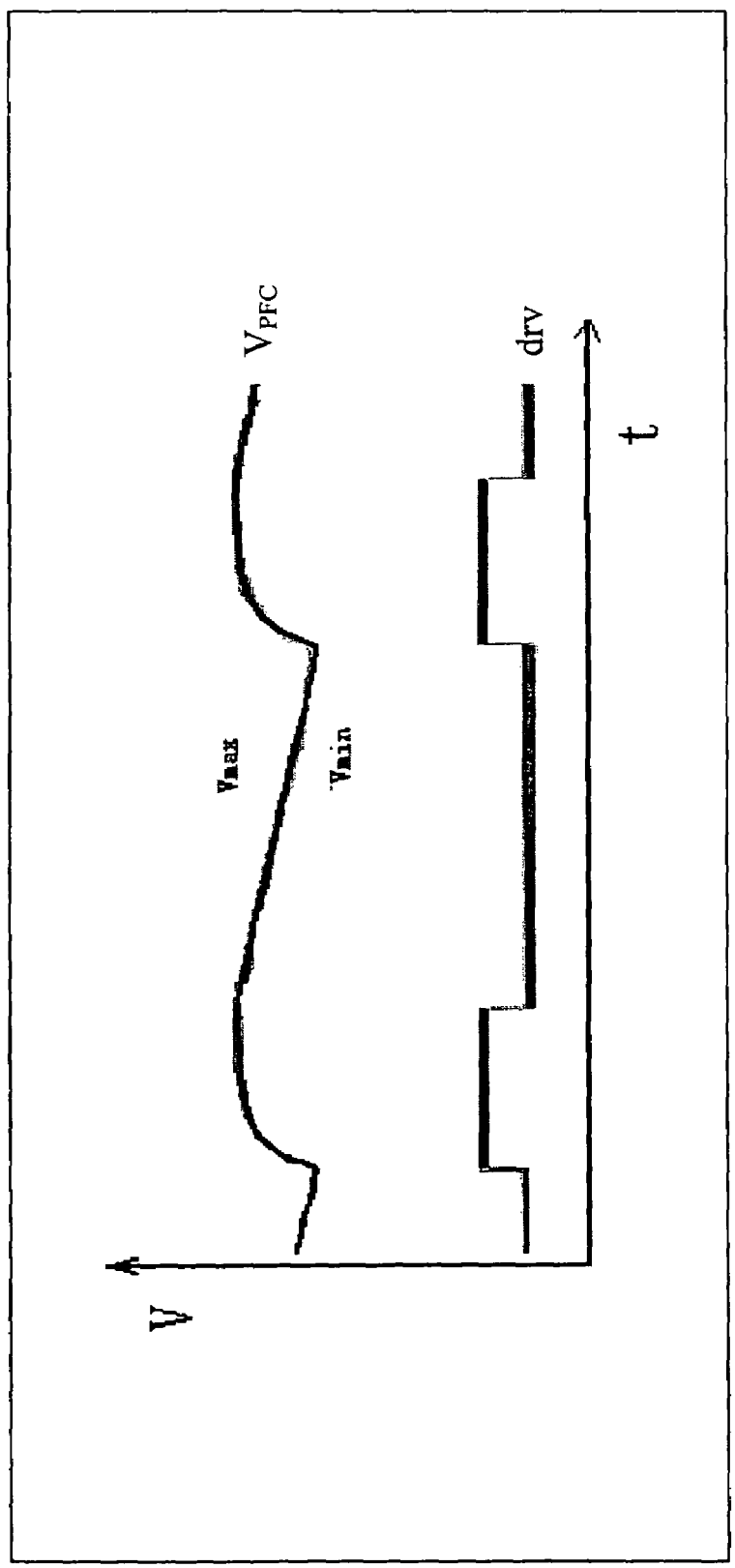
FIG. 3d shows a schematic view of the input voltage waveform and the voltage waveform of the driving coil of the auxiliary relay of another control strategy of embodiment 1 of the present invention.

The aforesaid operating principle is only one of the control strategies of the present embodiment, and actually there exist other control strategies. For example, the second control strategy may be employed for preventing the voltage of the successive stages (e.g. the auxiliary power supply) from being too low, the above mentioned second strategy can be employed. In particular, the lowest value of voltage is detected by the monitoring circuit 10, and a threshold of voltage is set in advance in the monitoring device 10, when it is detected that the voltage is lower than the threshold, the second electric control switch K2 is controlled by the monitoring circuit 10 to return to ON state. FIG. 3d is a schematic view of the control strategy, which will be discussed in detail below.

It is appreciated that the overvoltage protection method comprises the following steps by summarize the above operating principle: S1: the monitoring circuit 10 monitors the input voltage or/and output voltage of the switching power supply; S2: if the AC input is in the allowable range, then the open and close state of the first and second electric control switch K1, K2 are controlled, such that AC charges the filter capacitor C1 through soft start resistor Z1 and the second electric control switch K2, then after the completion of the soft start, K1 turns on and the module enters a normal operating state; S3: when the AC input has an overvoltage, the voltage of C1 rises, if a voltage higher than the predetermined voltage threshold is detected on C1 by the monitoring circuit 10, the control circuit cuts off K1, K2, and the energy stored in the filter capacitor C1 maintains the OFF state of the second electric control switch K2; S4: when the energy stored in the filter capacitor C1 is used up and its voltage is lowered to a certain threshold, the second electric control switch K2 returns to the ON state, such that AC can charge the filter capacitor C1 through the soft start resistor Z1 and the second electric control switch K2, therefore, the voltage of C1 rises gradually; S5: if the voltage of the filter capacitor C1 exceeds the allowable voltage again, the second electric control switch K2 will be cut off again and the aforesaid steps S3, S4 repeat; if the voltage of AC input decreases to be in the normal range, then the states of the first and second electric control switches K1, K2 are controlled, such that the module enters into a normal operating state.

Embodiment 2

Figure 4A:
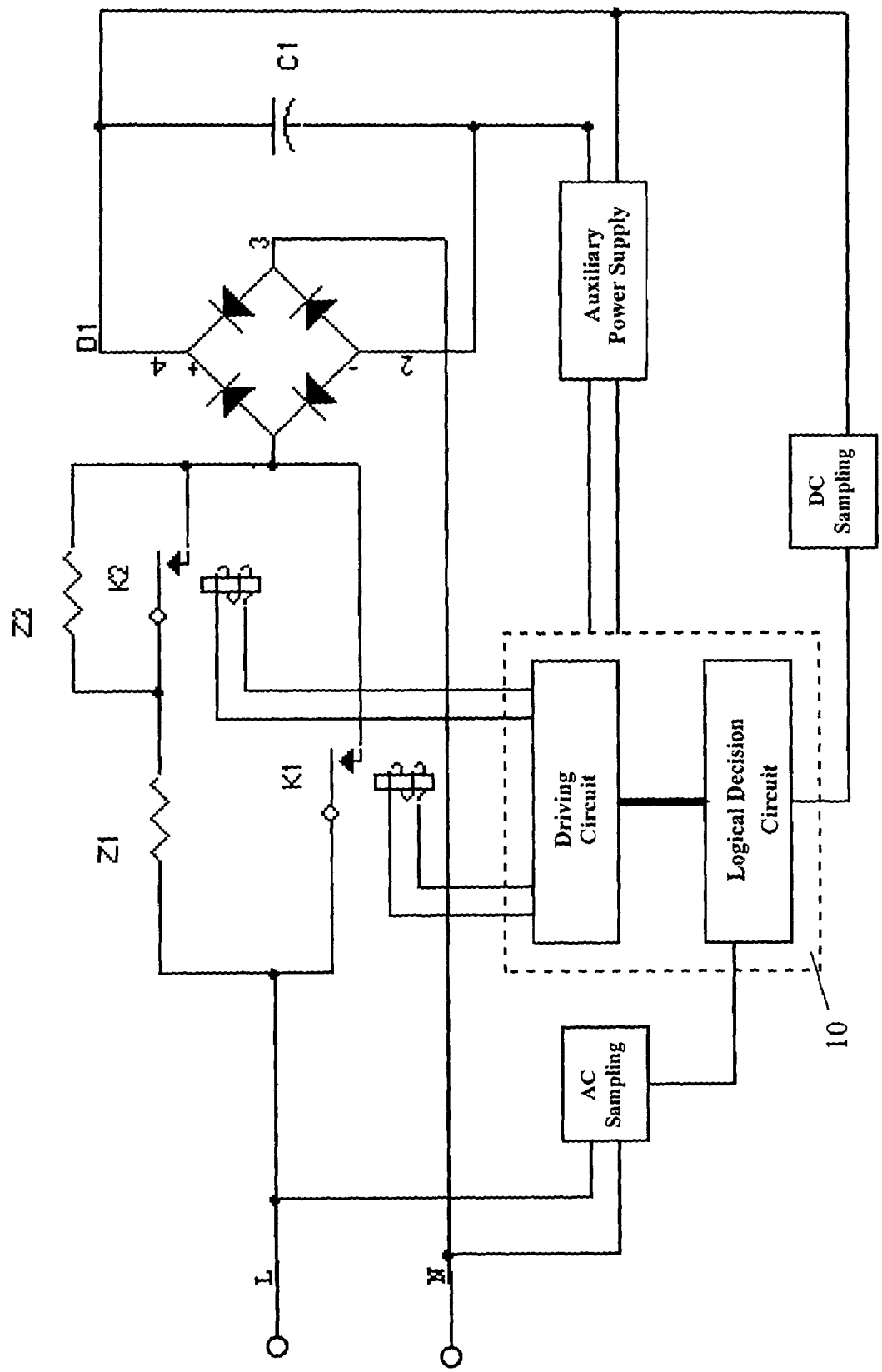
FIG. 4a shows a schematic view of the embodiment 2 of the present invention.

As shown in FIG. 4a, the present embodiment is characterized by an impedance Z2 connected in parallel with K2. It is preferable that a resistor is adopted as Z2. In FIG. 4a and figures thereafter, the monitoring circuit 10 is consisting of a logical decision circuit and a driving circuit.

The improved circuit has the same operating mode, and is characterized in that AC input continues to supply energy to the high voltage C1 through impedances Z1, Z2 when Z2 is in OFF state, such that the maintaining time of the auxiliary power supply, that is the duration of OFF state of K2 is elongated. Thus, the power consumption of Z1 is reduced significantly.

In the case that the resistance of Z2 becomes infinite, embodiment 2 is the same with embodiment 1.

Embodiment 3

Figure 4B:
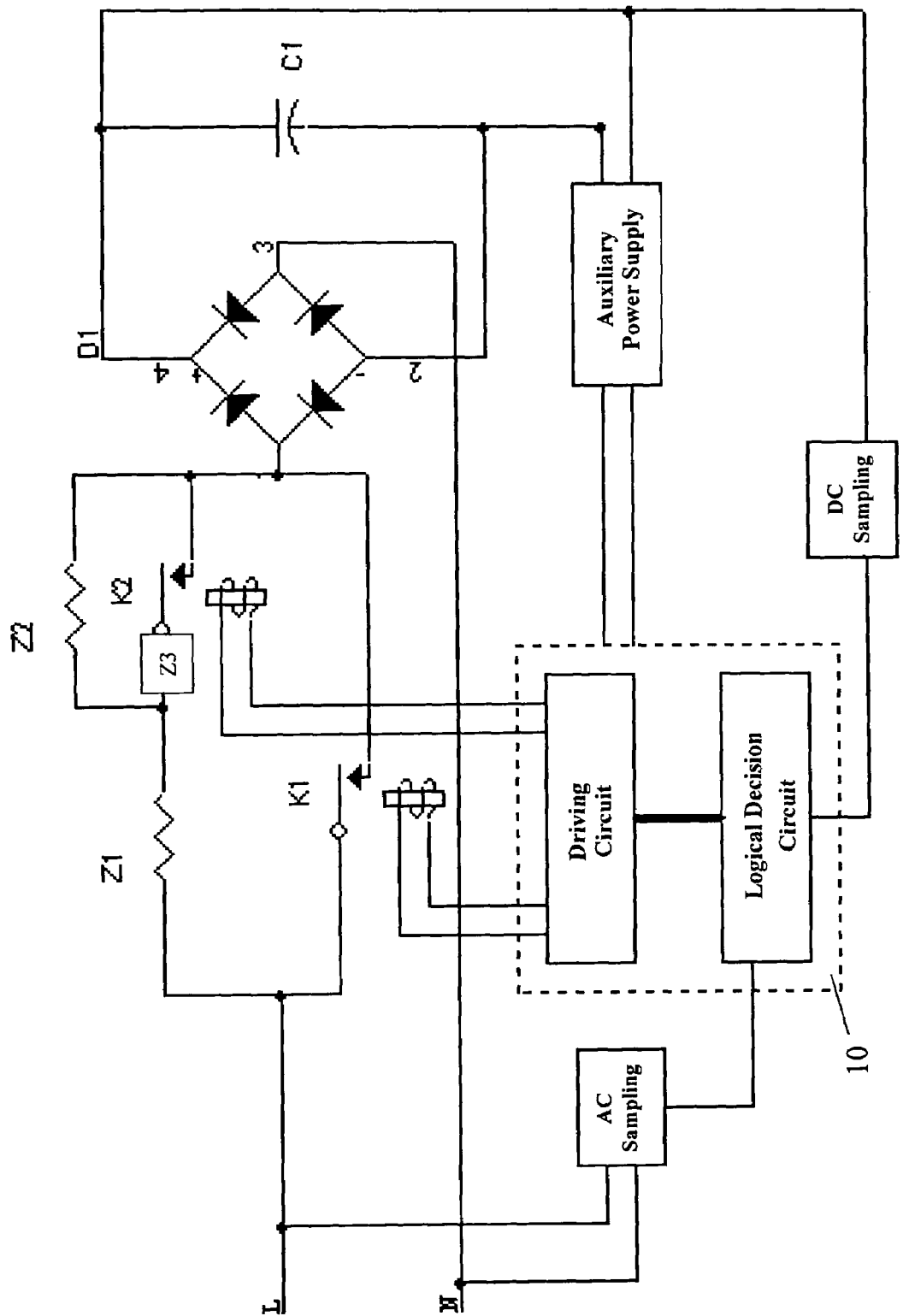
FIG. 4b shows a schematic view of the embodiment 3 of the present invention.

As shown in FIG. 4b, a third impedance Z3 connected in series with the second electric control switch K2 is provided compared with embodiment 2, and serially connected Z3 and K2 are connected in parallel with the second impedance Z2. This is because that Z3 is needed for avoiding an arc when Z2 is a capacitor.

Embodiment 4

Figure 5:
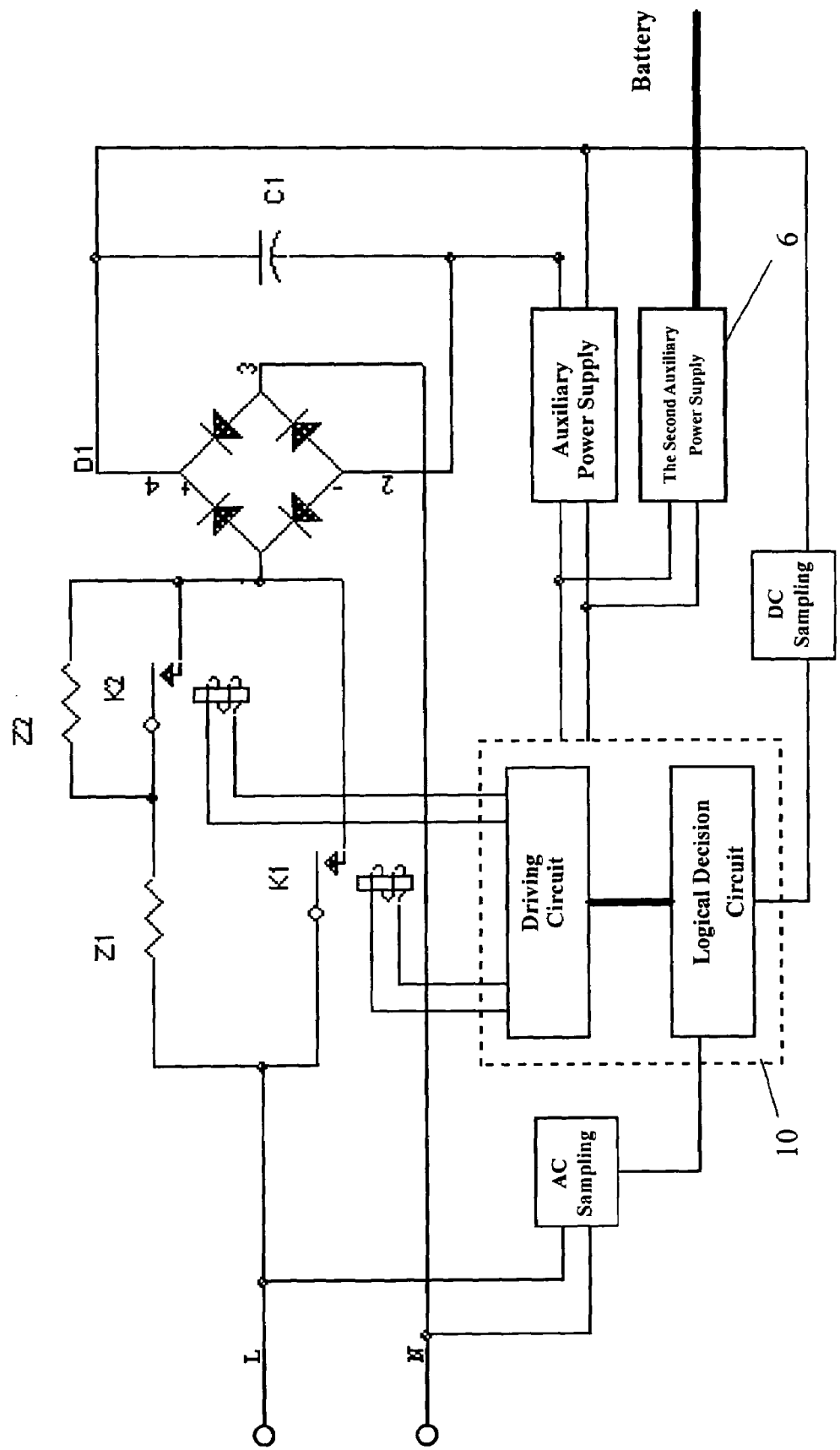
FIG. 5 shows a schematic view of the embodiment 4 of the present invention.

As shown in FIG. 5, double auxiliary power supplies are used in the present embodiment, that is, a second auxiliary power supply is provided, the input end of which is connected with the battery, and the output end of which is connected with the monitoring circuit 10.

In the case of double auxiliary power supply, if the energy storage device such as battery is in a normal state, when AC has an overvoltage, the auxiliary power supply may continuously supply energy for maintaining the OFF state of K2.

When the AC input is under an overvoltage, the voltage of C1 rises. If voltage of C1 does not exceed the allowable voltage of the capacitor, no action is performed; if the voltage of C1 higher than the allowable voltage of the capacitor is detected, the control circuit cuts off K1, K2, and the energy stored in the capacitor C1 maintains the OFF state of K2 while the normal open device K1 does not consume any energy. The battery maintains the OFF state of K2 through the conversion of the auxiliary power supply. If the voltage of AC input decreases to be in the normal range, K2 is actuated and K1 is actuated in a delay mode, the module starts to work normally.

If the battery does not exist or is used up, then the overvoltage protection is achieved in the above-mentioned manner.

Embodiment 5

Figure 6:
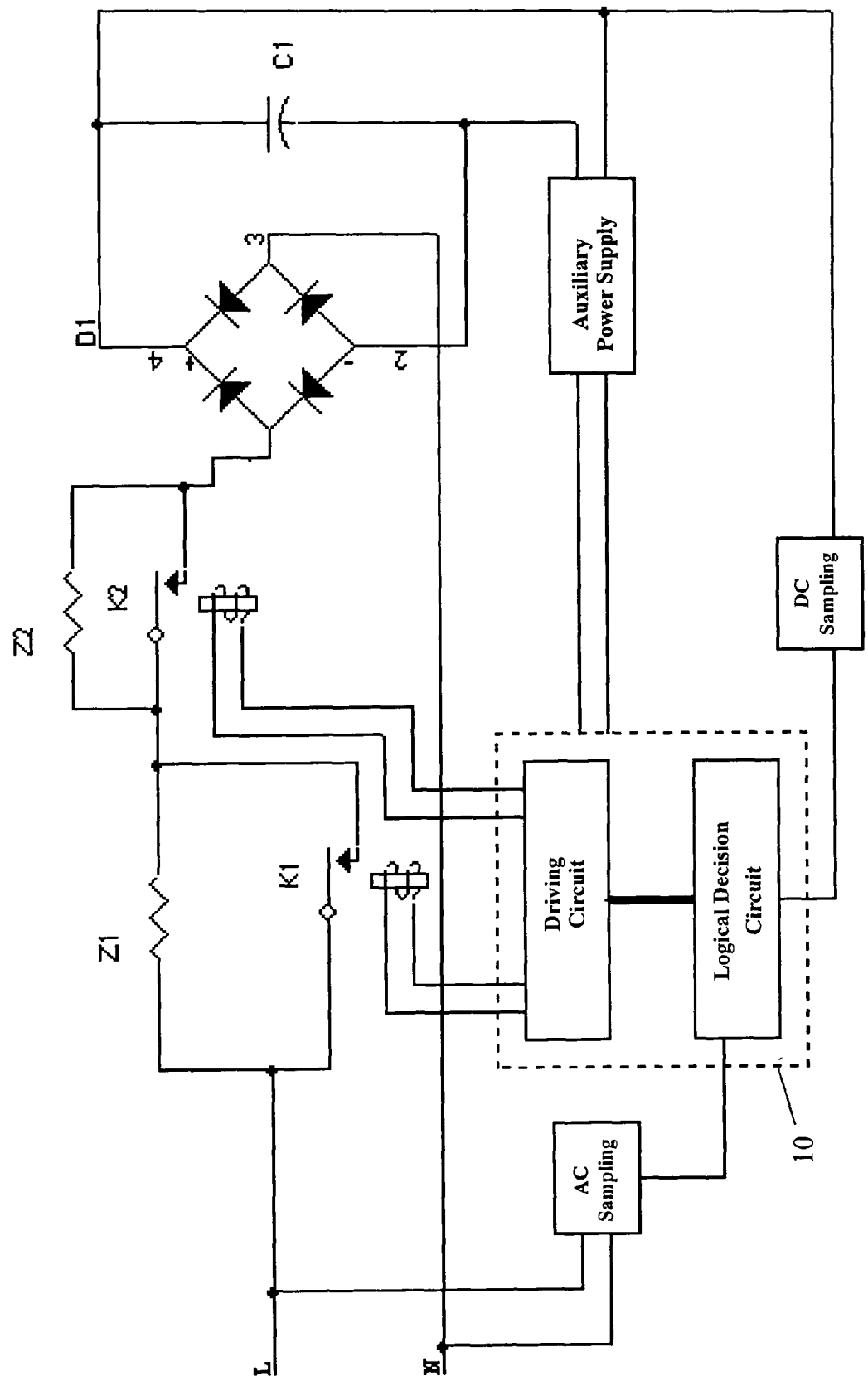
FIG. 6 shows a schematic view of the embodiment 5 of the present invention.

As shown in FIG. 6, the position of K2 is changed in the present embodiment, such that Z1 and K1 are connected in parallel, and then are connected to Z2 in series. The circuit is characterized in that AC supplies energy to the auxiliary power supply through Z1, Z2 and K2 rectifying devices after K1 is shut off.

Embodiment 6

Figure 7:
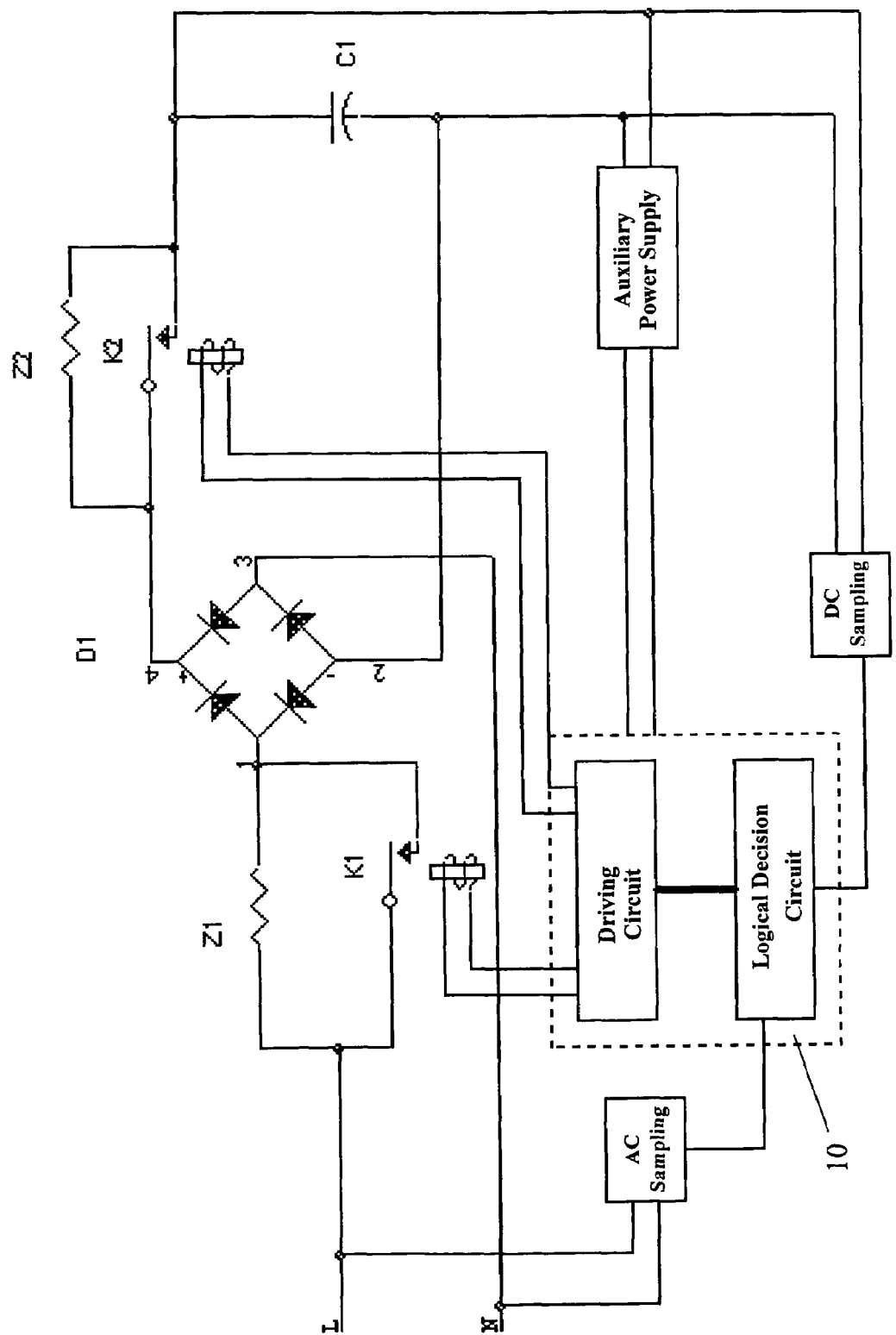
FIG. 7 shows a schematic view of the embodiment 6 of the present invention.

As shown in FIG. 7, the position of K2 is changed in the present embodiment, however, K2 is positioned downstream of the rectifying circuit. Thus, the rectifying circuit is not under the overvoltage protection.

The applications of the present invention in various situations are described below with reference to FIGS. 8a-12. The driving circuit portion (namely, Q1, Q2 etc.) of FIG. 3a and some other detailed portions are not shown in these views. Actually, the driving circuit portion in FIG. 3 also can be omitted.

Figure 8A:
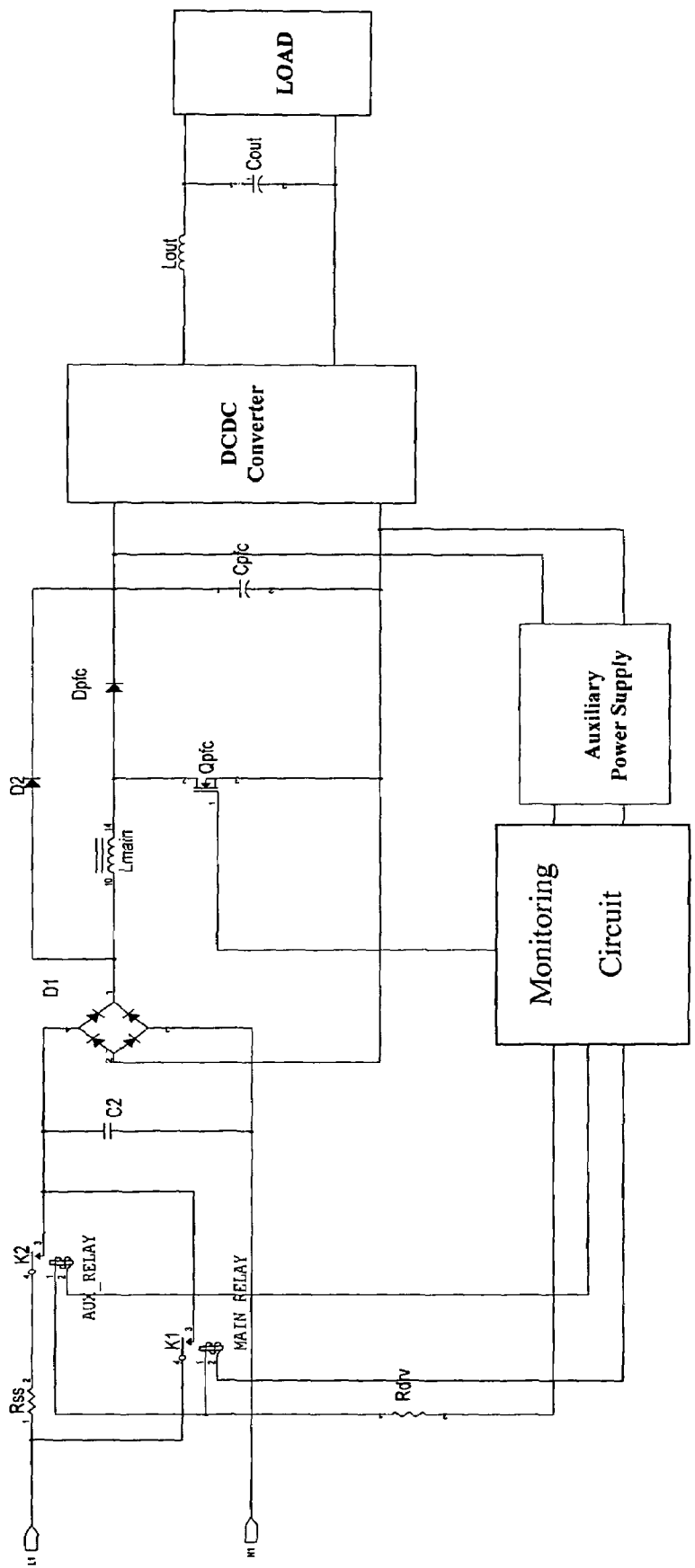
FIG. 8a shows a schematic view of a first implementation of the present invention.

FIG. 8a is a schematic view of the present invention used in a single phase input switching power supply with PFC, the control strategy of which is schematically shown in FIG. 3d. Vpfc is the voltage of the bus line capacitor Cpfc, and drv is the voltage of the driving coil of the auxiliary relay K2. Assuming that the electric level of drv is high, the auxiliary relay K2 is actuated, and the auxiliary relay K2 is released when the electric level of drv is low. The control strategy lies in that the main power circuit of the switching power supply module is cut off, and the main relay K1 is released when the input voltage Vin is higher than the predetermined protection voltage. The charging of the input power supply to the power supply module is controlled by controlling the actuation and release of K2, such that the voltage of the bus line Cpfc in the power supply is controlled in certain range, e.g., K2 is turned ON and the input power supply charges Cpfc via Rss when the voltage of Cpfc is lower than Vmin; and K2 is turned OFF when the voltage of Cpfc is higher than the upper limit Vmax. Thus, it is ensured that the bus line voltage inside the power supply is controlled within a safe range, to ensure the safety of the devices inside the power supply; and at the same time to ensure the voltage of the energy supply of the auxiliary power supply, such that the auxiliary power supply and the control circuit can work normally.

Figure 8C:
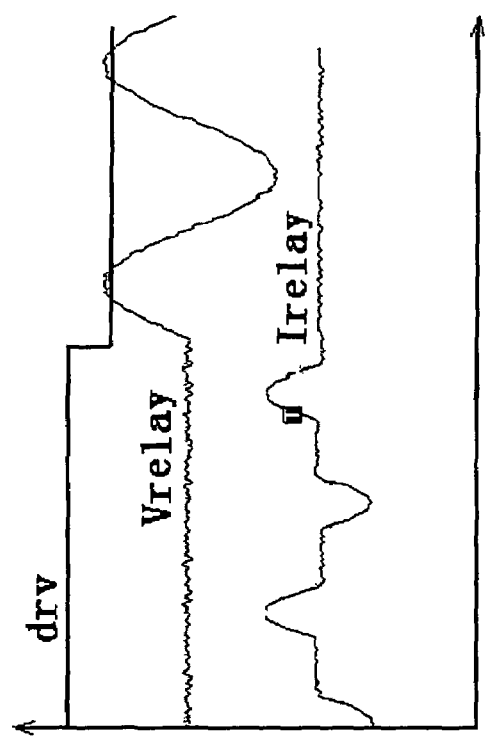
FIG. 8c shows the release waveform of the relay.
Figure 8B:
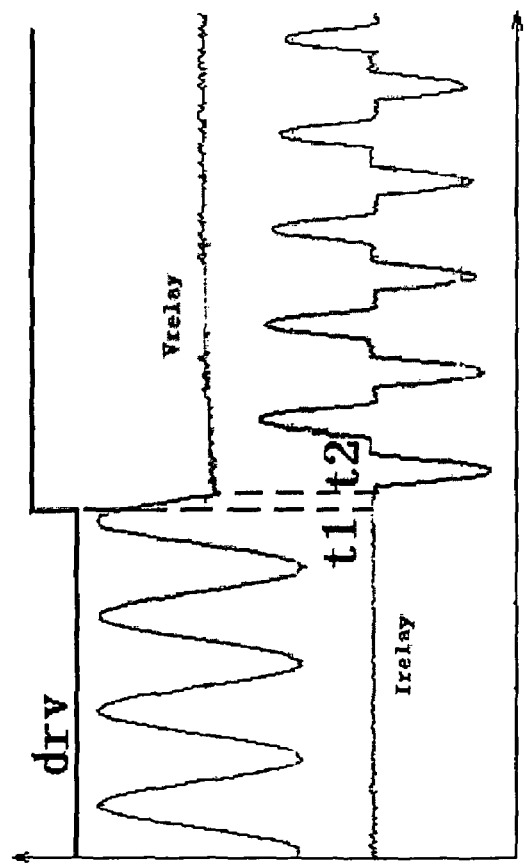
FIG. 8b shows the voltage-current waveform of the zero-voltage operating of the relay of the first implementation of the present invention.

At the instance of turning on, cutting off of the aforesaid relays, there may exist voltage and current at the contact point of the relay, thus when the voltage or current of the contact point is relative high, there may be certain damage to the contact point of the relay. Since the input voltage is a varying sine wave, for input voltage of single phase, Vin=Vpk*sin wt (w=100π). Therefore, there always exist two time periods when the absolute value of the input voltage is lower than the output bus line voltage Vpfc. Thus, as long as the input voltage is lower than the bus line voltage at the moment of turning on or cutting off of the auxiliary relay, there is no current at the moment of turning on or cutting off of the relay, namely turning on and cutting off with zero current. FIG. 8B is the waveform of the voltage and current of the zero current actuation of the relay, wherein Vrelay is waveform of the voltage between the two ends of the relay, Irelay is the current of the relay, and drv is the drive signal of the relay. The relay is actuated at time t2 when the rectifying bridge is in OFF state due to Vin (t2)<Vmin. Therefore, there is no current in the relay at the time of turning off. Actually the actuation of the relay has certain time delay, thus the turning on signal drv of the relay needs to be advanced appropriately. As shown in FIG. 8b, the relay may give the pulse for actuating the coil at time t1 in advance. FIG. 8c is the release waveform of the relay, and zero current switching can be achieved as long as the input voltage is lower than the bus line voltage, that is Vin (t)<Vmax at the release time of the relay. Since the release of the contact point of the relay has certain time delay, the releasing pulse needs to be advanced appropriately in practice.

Figure 9:
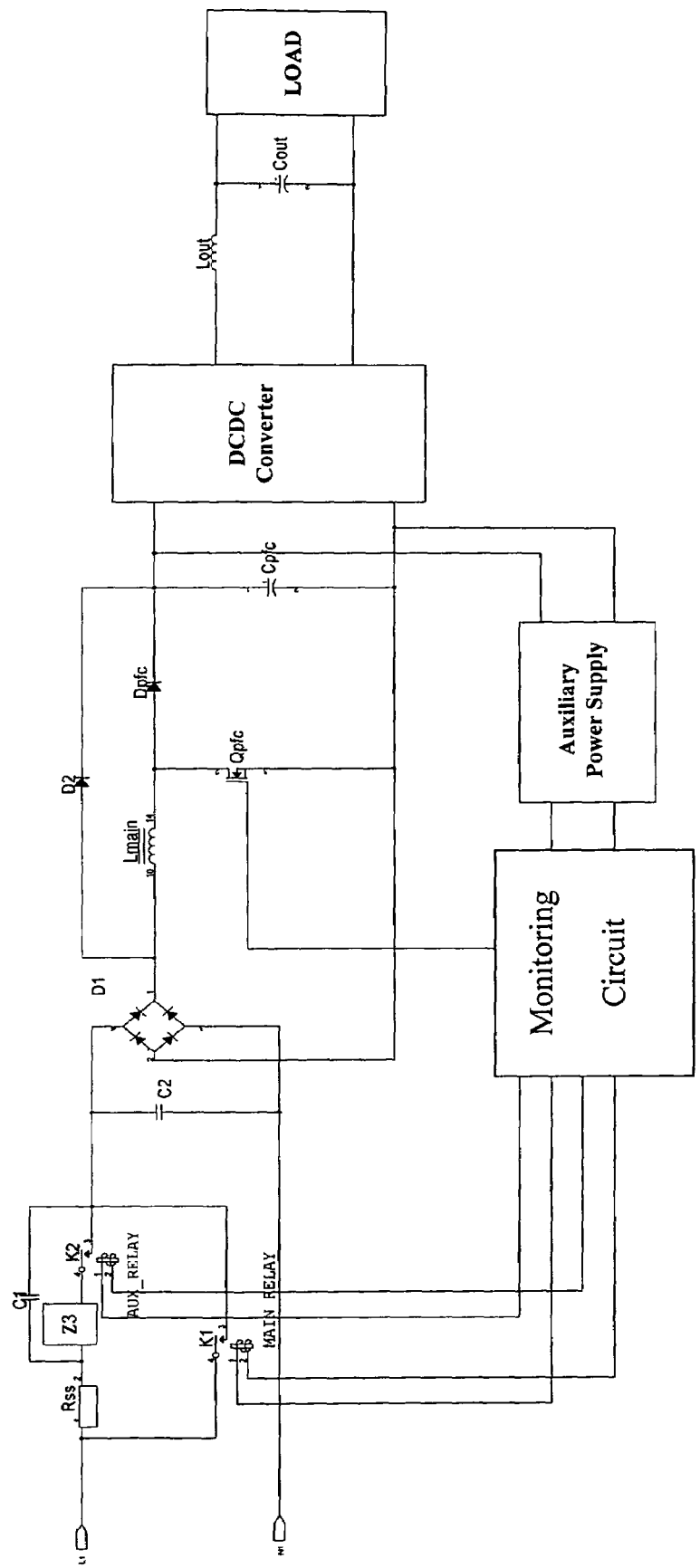
FIG. 9 shows a schematic view of a second implementation of the present invention.

FIG. 9 shows the circuit of FIG. 8a with a bypass capacitor provided on the auxiliary relay (namely, the case of embodiment 3). The function of the capacitor lies in that the input power supply may continue to charge the bus line capacitor Cpfc through Rss and C1 when the auxiliary relay is in OFF state, thus the frequency of actuation and release of the auxiliary relay can be reduced. However, the selection of Rss, C1 should meet the following requirement: the charging power of the power supply through Rss and C1 is lower than the smallest input power of the auxiliary power supply, and a third impedance Z3 connected in series to the second electric control switch K2 is required for avoiding arc, wherein the serially connected Z3 and K2 are connected with C1 in parallel.

Figure 10:
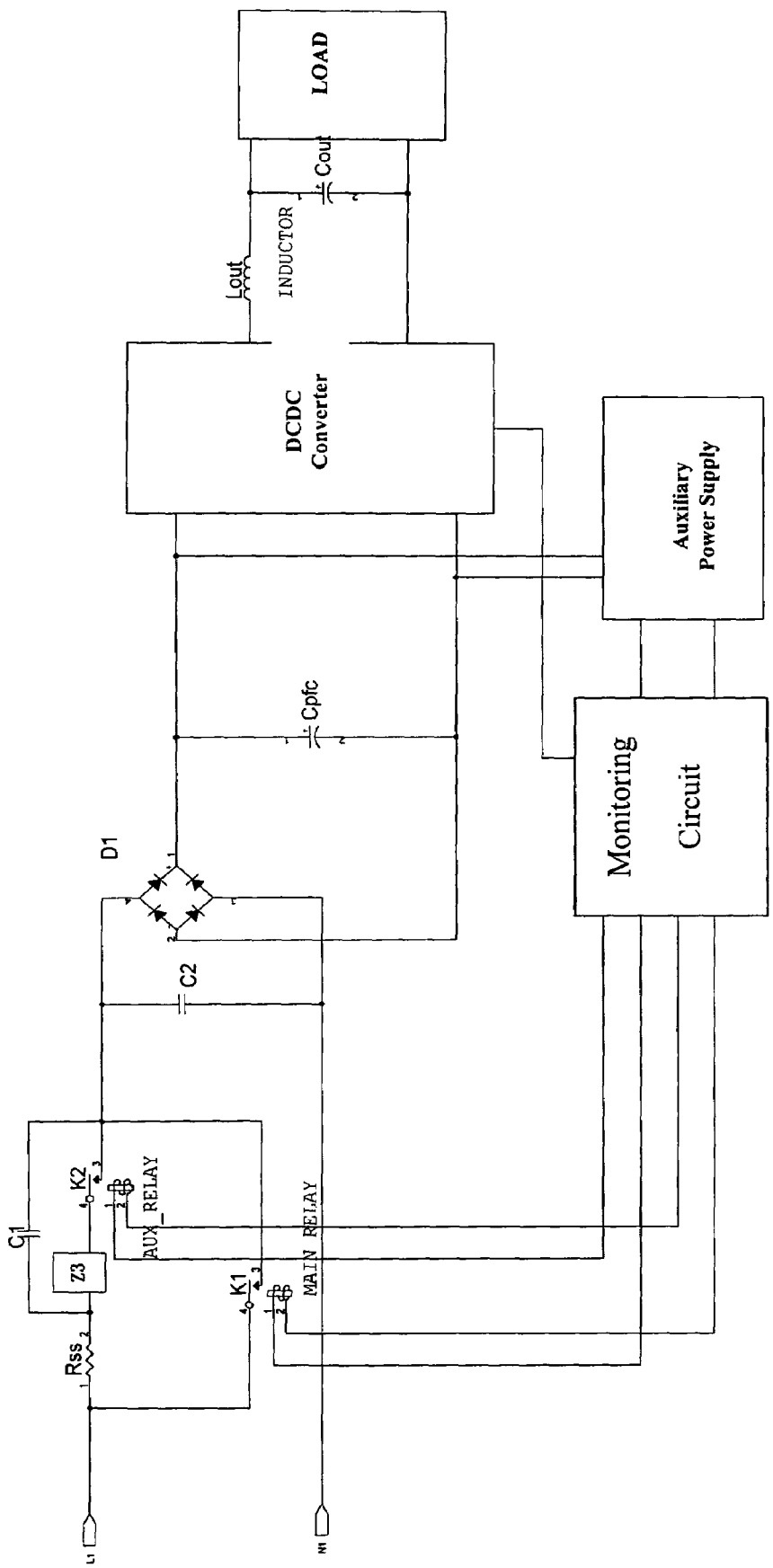
FIG. 10 shows a schematic view of a third implementation of the present invention.
Figure 11:
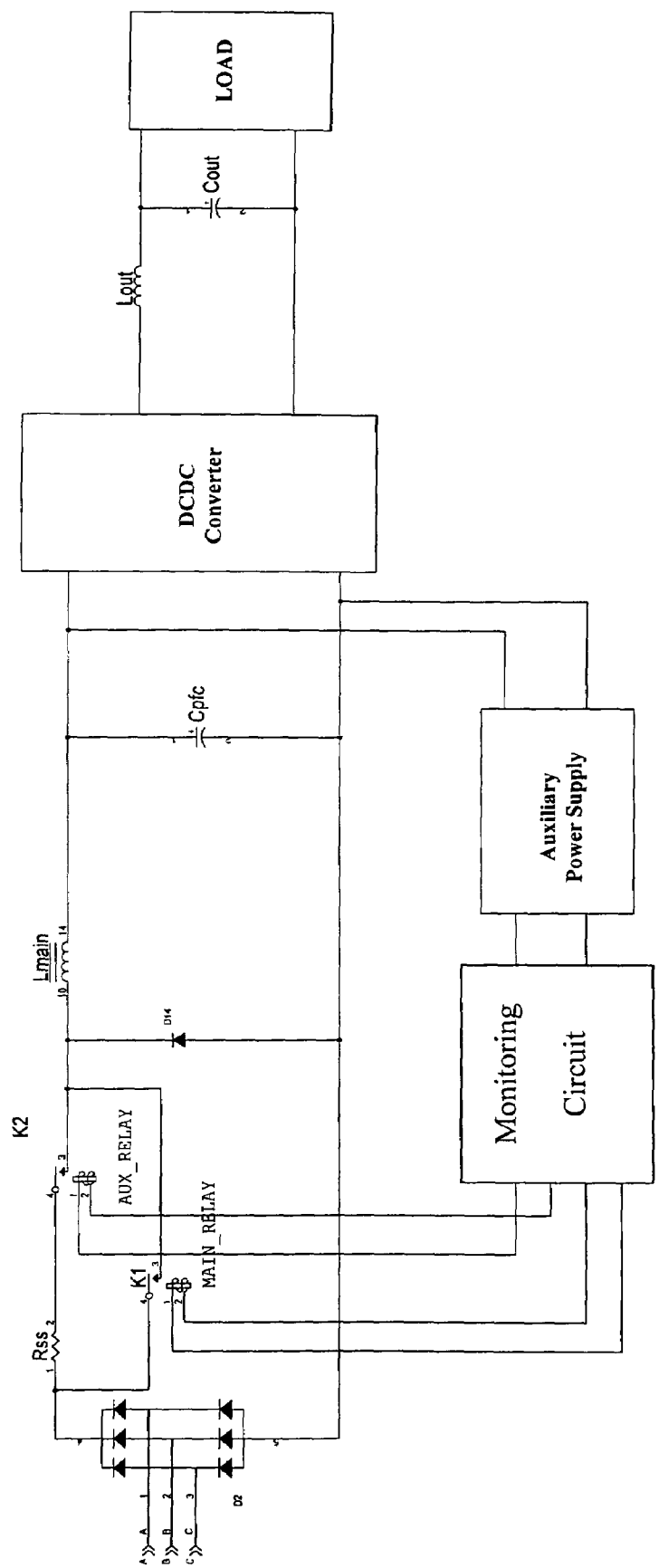
FIG. 11 shows a schematic view of a fourth implementation of the present invention.
Figure 12:
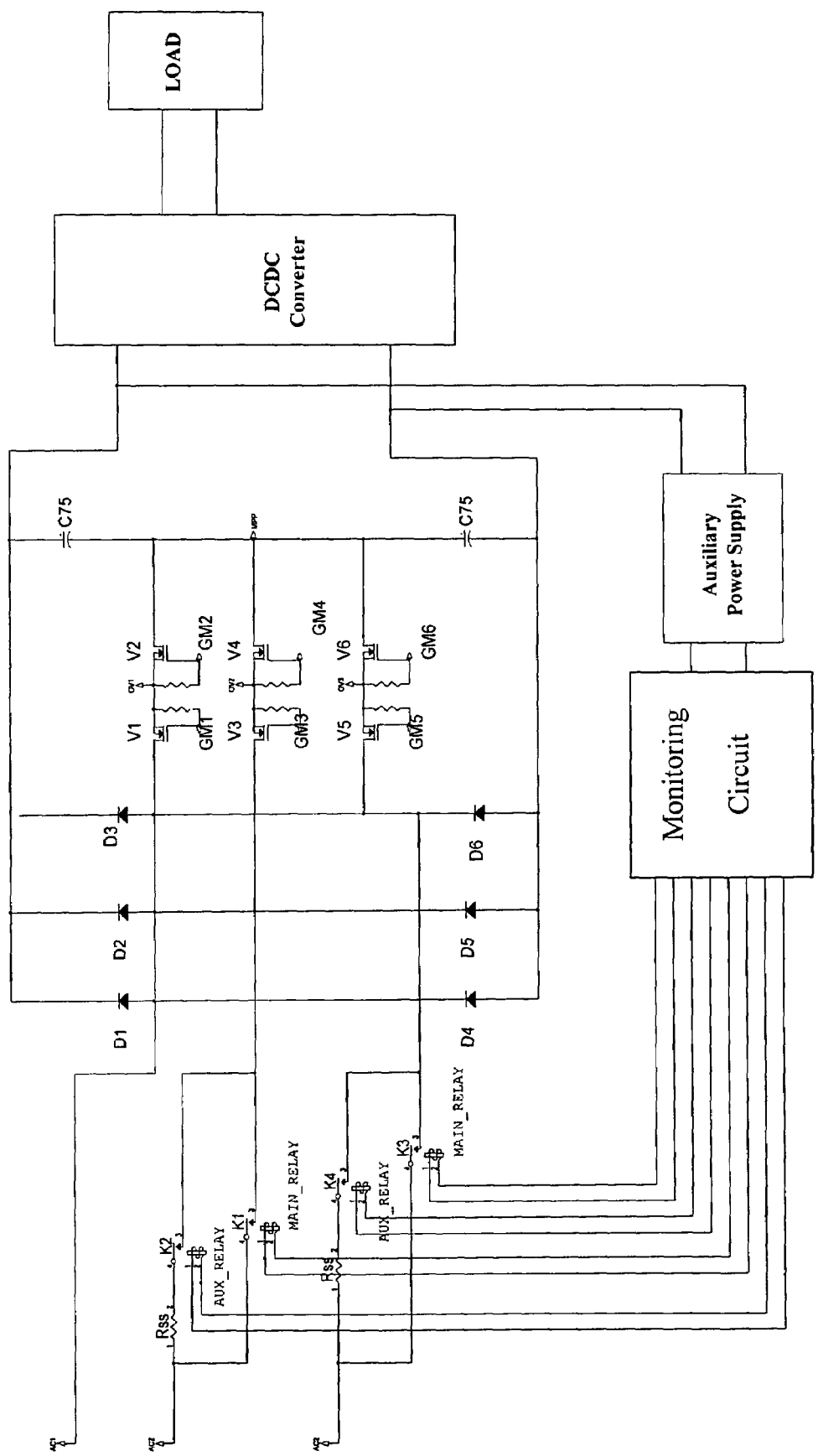
FIG. 12 shows a schematic view of a fifth implementation of the present invention.

The present invention can also be used in a circuit without power factor PFC correction, as shown in FIG. 10. The present invention can also be used in a three-phase circuit, e.g., FIG. 11 is an overvoltage protection circuit of three-phase input without PFC correction, and FIG. 12 is the protection mode of a three-phase circuit with PFC.

By only adding simple hardware and control, good effect can be achieved in the present circuit. It is easy to achieve operation under long-term high voltage without damage to the module, e.g. it is easy to achieve operation under long-term high voltage of 415 Vac without damage to the module in single-phase module by using capacitor of 450 Vdc and power device of 500 V.

The invention claimed is:

1. A switching power supply:
    a soft start circuit;
    a rectifying circuit electrically communicating with the soft start circuit;
    a filter capacitor electrically communicating with an output of the rectifying circuit;
    a main power supply in parallel with the filter capacitor;
    an auxiliary power supply electrically connected to the rectifying circuit and a monitoring circuit that detects voltage and is responsive to the detected voltage;
    wherein the soft start circuit includes a soft start resistor and in parallel with a first switch and a second switch;

wherein after a current is applied to the rectifying circuit and to the filter capacitor via the soft start circuit, resultant rectified current is output to the main power supply and the auxiliary power supply, wherein the auxiliary power supply supplies DC voltage to the monitoring circuit;

wherein the monitoring circuit voltage associated with the main power supply and controls the first switch in accordance therewith;

wherein the second switch is connected in series with the soft start resistor wherein the monitoring circuit controls an ON or OFF state of the second switch.

2. The switching power supply of claim 1 wherein the second switch and the soft start resistor are in series, and the second switch and the soft start resistor are in parallel with the first switch.

3. The switching power supply of claim 1 further comprising a second impedance in parallel with the second switch.

4. The switching power supply of claim 1 further comprising a second impedance and a third impedance, the third impedance and the second switch being in series, the third impedance and second switch in parallel with the second impedance.

5. The switching power supply of claim 1 further comprising a second auxiliary power supply having an input connected to a battery and an output connected with the monitoring circuit (10).

6. The switching power supply of claim 1 wherein the first and second switches are relays.

7. An overvoltage protection method for a switching power supply, comprising:

a monitoring a voltage of a switching power supply;

if a monitored input is in a predetermined range, then controlling a first normally open switch and a second normally closed switch to charge a filter capacitor through a soft start resistor and the second switch, and controlling the first switch in a normal operating state following execution of a soft start;

when the monitored input indicates an overvoltage, monitoring a voltage of the filter capacitor and if the monitored voltage of the filter capacitor exceeds a first predetermined threshold, controlling the first and second switches and the energy stored in the filter capacitor maintains the second switch in a non-conducting state;

when the voltage of the filter capacitor falls below a second predetermined threshold, controlling the second switch so that the filter capacitor is charged through the soft start resistor and the second switch;

if the voltage of the filter capacitor exceeds the first predetermined threshold a second time, the second control switch will be maintained in a non-conductive state;

when the monitored voltage returns to within the predetermined range, controlling the first and second switches in normal operating state.

8. The overvoltage protection method according to claim 7 further comprising setting the second predetermined value in advance.

9. The overvoltage protection method for a switching power supply according to claim 7 further comprising controlling the first and second control switches such that a monitored voltage is less than a bus line voltage so that the current is zero when either of the first or second switches are activated.

* * * * *